United States Patent
Ukidwe et al.

(10) Patent No.: US 12,386,231 B2
(45) Date of Patent: Aug. 12, 2025

(54) OPTICALLY TRANSPARENT POLYMER ELECTROLYTE FILMS

(71) Applicant: DelStar Technologies, Inc., Alpharetta, GA (US)

(72) Inventors: Nandan Ukidwe, Suffield, CT (US); James Kidwell, Maple Grove, MN (US); Dave Collette, South Hadley, MA (US)

(73) Assignee: DelStar Technologies, Inc., Alpharetta, GA (US)

( * ) Notice: Subject to any disclaimer, the term of this patent is extended or adjusted under 35 U.S.C. 154(b) by 0 days.

(21) Appl. No.: 18/734,555

(22) Filed: Jun. 5, 2024

(65) Prior Publication Data

US 2024/0319555 A1    Sep. 26, 2024

Related U.S. Application Data

(63) Continuation of application No. 17/550,090, filed on Dec. 14, 2021, now Pat. No. 12,032,260.

(60) Provisional application No. 63/126,221, filed on Dec. 16, 2020.

(51) Int. Cl.
*G02F 1/1506* (2019.01)
*G02F 1/15* (2019.01)

(52) U.S. Cl.
CPC ...... *G02F 1/1508* (2013.01); *G02F 2001/164* (2019.01)

(58) Field of Classification Search
CPC .................................................. G02F 1/1508
See application file for complete search history.

(56) References Cited

U.S. PATENT DOCUMENTS

| | | |
|---|---|---|
| 6,361,709 B1 | 3/2002 | Bauer et al. |
| 7,586,663 B1 | 9/2009 | Radmard et al. |
| 9,249,353 B2 | 2/2016 | Posset et al. |
| 10,310,352 B2 | 6/2019 | Garcia et al. |
| 11,086,181 B2 | 8/2021 | Agrawal et al. |
| 12,061,403 B2* | 8/2024 | He .................. C09K 9/02 |
| 2003/0075066 A1 | 4/2003 | Tan et al. |
| 2011/0149366 A1 | 6/2011 | Percec et al. |
| 2016/0244553 A1 | 8/2016 | Reynolds et al. |
| 2017/0219905 A1* | 8/2017 | Garcia ............ G02F 1/1508 |
| 2019/0284347 A1 | 9/2019 | Higuchi et al. |

(Continued)

FOREIGN PATENT DOCUMENTS

WO    WO2019/178099 A1    9/2019

OTHER PUBLICATIONS

International Search Report and the Written Opinion of the International Searching Authority; PCT/US21/63210 dated Mar. 8, 2022.

*Primary Examiner* — Rhonda S Peace
(74) *Attorney, Agent, or Firm* — Farber LLC

(57) ABSTRACT

Provided are electrolyte films or cells for use in variety of applications, such as electrochromic windows. An electrolytic film comprises a polymer layer, such as thermoplastic polyurethane or polymethyl methacrylate, and an electrolyte within the polymer layer. The electrolyte comprises a salt and a plasticizer. The plasticizer comprises one or more materials that are selected to provide sufficient conductivity and optical transparency for operation of the electrolyte film in an application requiring substantial optical clarity and switching speed, such as a smart window.

21 Claims, 4 Drawing Sheets

(56) References Cited

U.S. PATENT DOCUMENTS

| 2020/0017648 A1 | 1/2020 | Agrawal et al. |
| 2020/0019032 A1 | 1/2020 | Agrawal et al. |
| 2021/0041757 A1 | 2/2021 | He et al. |
| 2022/0187669 A1 | 6/2022 | Ukidwe et al. |
| 2024/0319555 A1* | 9/2024 | Ukidwe ................ G02F 1/1525 |
| 2025/0138377 A1* | 5/2025 | Ukidwe ................ G02F 1/1525 |

* cited by examiner

OPTICALLY TRANSPARENT POLYMER ELECTROLYTE FILMS

TECHNICAL FIELD

This description generally relates to electrolyte films and more particularly to electrolyte films for use in electrochromic cells, such as those used in electrochromic windows.

BACKGROUND

Electrochromic windows, also known as smart windows, are a new technology for energy efficiency in buildings that controls the amount of sunlight passing through. They can also produce less glare than fritted glass. Their efficiency depends on their placement, size, and weather, which affect the amount of sunlight exposure.

Smart windows with switchable light transmittance and reflectance are fast gaining popularity. They are very much tied into the emerging trend of sustainable, energy efficient dwellings. Among the different possible technologies for smart windows, electrochromism is one of the most promising. Electrochromism is a phenomenon where the color or opacity of a material changes depending on the application of voltage. Changing the light transmission properties in response to voltage allows for control over the amount of light and heat passing through. Once the change has been effected, no electricity is needed for maintaining the particular shade which has been reached. By doing so, an electrochromic window can block certain wavelengths of UV, IR or visible light on demand.

The basic structure of an electrochromic device or ECD typically embodies five superimposed layers on one substrate or positioned between two substrates in a laminated configuration. In this structure, there are three principally different kinds of layered materials in the ECD: electrochromic (EC) layers, transparent conductive layers and an electrolyte. The EC layers conduct ions and electrons and belong to the class of mixed conductors. The electrolyte layer is a pure ion conductor and separates the two EC layers. The transparent conductors are pure electron conductors. Optical absorption occurs when electrons move into the EC layers from the transparent conductors along with charge balancing ions entering from the electrolyte.

The ion conductive layer can be a liquid as is found in wet cell batteries. An example of such liquid ion conductive layer is propylene carbonate containing lithium perchlorate. One drawback with liquid electrolyte is that while it demonstrates acceptable ionic conductivity, it can leak out of the ECD, posing significant risk to end users. To solve this problem, the ion conductive layer can be a polymeric interlayer that is in solid state under ambient conditions. Examples of such solid-state ionic conductive layers are described in *Ionic Conductivity of Polyether-Polyurethane Networks Containing Alkali Metal Salts. An Analysis of the Concentration Effect, Macromolecules*, Vol. 17, No. 1, 1984, pgs. 63-66, to Killis, et al; and *Poly(dimethylsiloxane)-Poly(ethylene oxide) Based Polyurethane Networks Used As Electrolytes in Lithium Electrochemical Solid State Batteries, Solid State Ionics*, 15 (1985) 233-240, to Bouridah, et al., the complete disclosures of which are incorporated herein by reference in their entirely for all purposes.

While the solid polymeric interlayer electrolyte eliminates the possibility of electrolyte leakage, it suffers from poor ionic conductivity. One solution to this problem is to imbibe or plasticize the polymer with a liquid electrolyte to combine the mechanical benefits of a solid-state electrolyte with the high ionic conductivities of liquid electrolytes. For example, a thermoplastic urethane polymer can be plasticized with propylene carbonate containing a lithium salt. This film can be in solid state and with good mechanical strength under ambient conditions. Furthermore, it can also show a significant improvement in ionic conductivity compared to a film comprising the neat polymer containing the lithium salt additive. An example of this type of electrolyte is described in U.S. Pat. No. 8,673,503, the complete disclosure of which is incorporated herein by reference in its entirety for all purposes.

While films such as the one described above may work well in batteries or other applications, they are not optimized for smart windows because they are not sufficiently transparent. This is because the polymer and the plasticizer are not compatible with each other, i.e., they do not completely dissolve into each other in solution. For example, it has surprisingly been discovered that an optical grade polyether-based thermoplastic polyurethane polymer (i.e., Estane AG8451 from Lubrizol) plasticized with 43 phr propylene carbonate containing either 8.3 or 12.5% w lithium perchlorate ($LiClO_4$) develops significant haze under ambient conditions, although the resulting film shows good mechanical properties. Loss of optical clarity on account of incompatibility between the polymer and the liquid electrolyte makes such polymer electrolyte films of little value in electrochromic window applications.

What is needed, therefore, are improved formulations that can allow for the incorporation of electrolytes containing organic carbonates into a polymer film without jeopardizing the optical clarity of the resulting electrolyte film.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The present description generally relates to electrolyte films and more particularly to electrolyte films for use in electrochromic cells, such as those used in electrochromic windows. In one aspect, an electrolyte film comprises a polymer layer and an electrolyte within the polymer layer. The electrolyte comprises a salt and a plasticizer. The plasticizer comprises one or more materials that are selected to provide sufficient conductivity and optical transparency for operation of the electrolyte film in an application requiring substantial optical transparency, such as a smart window.

In certain embodiments, the plasticizer comprises one or more organic carbonates and a second plasticizer material embedded with the salt in the polymer layer. The organic carbonate and the second material are selected such that the Ra between the plasticizer and the polymer layer is less than about 5.0, preferably less than or equal to about 3.79. Ra is defined herein as the Hansen Solubility Parameter, which generally represents the overall compatibility of two materials to dissolve into one another and form a solution. Applicant has discovered that the Hansen Solubility Parameter is a reliable measure of the overall optical clarity of two or more co-solvents.

In certain embodiments, the materials of the plasticizer are selected to have a haze of about 2% or less as measured by ASTM D1003-13. Applicant has discovered that the plasticizer materials described herein also have an Ra of about 3.79 or less versus certain polymers which provides sufficient optical transparency for operation of the electrolyte film in desired applications, such as smart windows.

The organic carbonate and the second material are also selected to provide an ionic conductivity through the electrolyte film of at least about $3.85 \times 10^{-5}$ Siemens/cm, and preferably between about $3.85 \times 10^{-5}$ and $6 \times 10^{-4}$ Siemens/cm.

In certain embodiments, the organic carbonate is selected from the group consisting of diethyl carbonate, propylene carbonate, ethylene carbonate, gammabutryrolactone, dimethyl carbonate, methyl ethyl carbonate, glycerin carbonate, butylene carbonate, alkylene carbonate and combinations thereof. In an exemplary embodiment, the organic carbonate is selected from the group consisting of diethyl carbonate, propylene carbonate and ethylene carbonate.

In one embodiment, the plasticizer comprises two or more organic carbonates, such as diethyl carbonate, propylene carbonate or ethylene carbonate, that are mixed together. Applicant has discovered that a selected mixture of two or more such organic carbonates reduces the overall Ra between the plasticizer and the polymer, thereby increasing the optical clarity of the electrolyte film. In one such embodiment, the plasticizer comprises a mixture of diethyl carbonate and propylene carbonate that provides sufficient conductivity and optical clarity to the electrolyte film. In an exemplary embodiment, the mixture contains of about 40% to 90% by volume of the propylene carbonate, more preferably about 50% to about 85% by volume, with the remainder of the mixture substantially comprising diethyl carbonate.

In another embodiment, the second material is selected from the group consisting of a dibenzoate, an acrylate monomer, a phthalate, an aliphatic ester, a non-aliphatic ester, an ethylene glycol bis, a trimellitate, a sebacate, an adipate, a terephthalate, a gluterate, a glyceride, an azelate, a maleate, an epoxidized soybean oil, glycols and polyethers, organophosphates, alkyl citrates, glycerol and acetylated monoglycerides or a mixture thereof. In this embodiment, the plasticizer contains one of these materials combined with an organic carbonate, such as those described above. Applicant has found that a combination of an organic carbonate with one or more of these materials at certain volume percentages reduces the overall Ra between the plasticizer and the polymer, thereby increasing the optical clarity of the electrolyte film.

In a preferred embodiment, the second material of the plasticizer comprises a dibenzoate or an acrylic monomer. Thus, the plasticizer will comprise an organic carbonate and a dibenzoate or an acrylic monomer in a relative volume percentage that provides sufficient conductivity and optical clarity to the electrolyte film. In an exemplary embodiment, the dibenzoate or acrylic monomer has a volume percentage of between about 20% and about 80%, preferably between about 50% and 90%, with the remainder of the volume comprising an organic carbonate.

Suitable plasticizers may include, but are not limited to: (1) propylene carbonate and a dibenzoate, with the dibenzoate comprising about 45% to about 95% by volume of the plasticizer; (2) ethylene carbonate and a dibenzoate, with the dibenzoate comprising about 55% to about 95% by volume of the plasticizer; (3) diethyl carbonate and a dibenzoate, with the dibenzoate comprising about 50% to about 95% by volume of the plasticizer; (4) ethylene carbonate and an acrylic monomer, with the acrylic monomer comprising about 48% to about 75% by volume of the plasticizer; (4) propylene carbonate and an acrylic monomer, with the acrylic monomer comprising about 33% to about 75% by volume of the plasticizer; (5) a mixture of 50% by volume of ethylene carbonate and 50% by volume of propylene carbonate combined with the material, wherein the material comprises a dibenzoate, and wherein the dibenzoate comprises about 50% to about 95% by volume of the plasticizer; (6) a mixture of 50% by volume of diethyl carbonate and 50% by volume of propylene carbonate combined with the material, wherein the material comprises a dibenzoate, and wherein the dibenzoate comprises about 5% to about 95% by volume of the plasticizer; (7) a mixture of 33% by volume of diethyl carbonate and 66% by volume of propylene carbonate combined with the material, wherein the material comprises a dibenzoate, and wherein the dibenzoate comprises about 20% to about 95% by volume of the plasticizer; or (8) a mixture of 66% by volume of diethyl carbonate and 33% by volume of propylene carbonate combined with the material, wherein the material comprises a dibenzoate, and wherein the dibenzoate comprises greater than 0% to about 95% by volume of the plasticizer.

The polymer layer may comprise any suitable polymer that provides sufficient transparency to visible light and exhibits suitable adhesion to the other surfaces of the electrochromic film which the polymer may contact. Suitable polymers include thermoplastic polymers or acrylic polymers, such as polymethyl methacrylate (PMMA). In preferred embodiments, the polymer comprises a thermoplastic polymer, such as thermoplastic polyurethane (TPU). In an exemplary embodiment, the polymer comprises an aliphatic thermoplastic polyurethane having a durometer of about 70 Shore A to about 80 Shore D.

The salt preferably comprises an alkali or alkaline earth metal salt, such as lithium salt or salts with cations having the elements of Na, K, Cs, Mg and Ag. Suitable lithium salts include: LiCl, LiF, LiI, $LiNO_3$, $LiClO_4$, $LiBF_4$, $LiPF_6$, $LiAsF_6$, lithium triflate, lithium imide, LiTFSI, LiTDI and the like.

In another aspect, an electrochromic cell comprises first and second layers of an optically transparent material, such as glass or other suitable material, and an ion conductive layer between the first and second layers. The ion conductive layer comprises a polymer layer, a salt and a plasticizer. The plasticizer is selected such that an Ra between the plasticizer and the thermoplastic polymer layer is less than 5, preferably less than 3.79.

The electrochromic cell may further include first and second electrochromic layers disposed between the first and second layers of optically transparent material and the ion conductive layer. The cell may further include a layer of transparent conductive oxide between each of the first and second layers of optically transparent material and the first and second electrochromic layers.

In another aspect, a window is provided that comprises an electrochromic cell, such as that described above. The window has a transmittance greater than about 80%, and preferably greater than about 85%, and a switching speed in the range of less than 1 minute, preferably less than 30 seconds.

The recitation herein of desirable objects which are met by various embodiments of the present description is not meant to imply or suggest that any or all of these objects are present as essential features, either individually or collectively, in the most general embodiment of the present description or in any of its more specific embodiments.

DETAILED DESCRIPTION OF THE EMBODIMENTS

Figure 1:
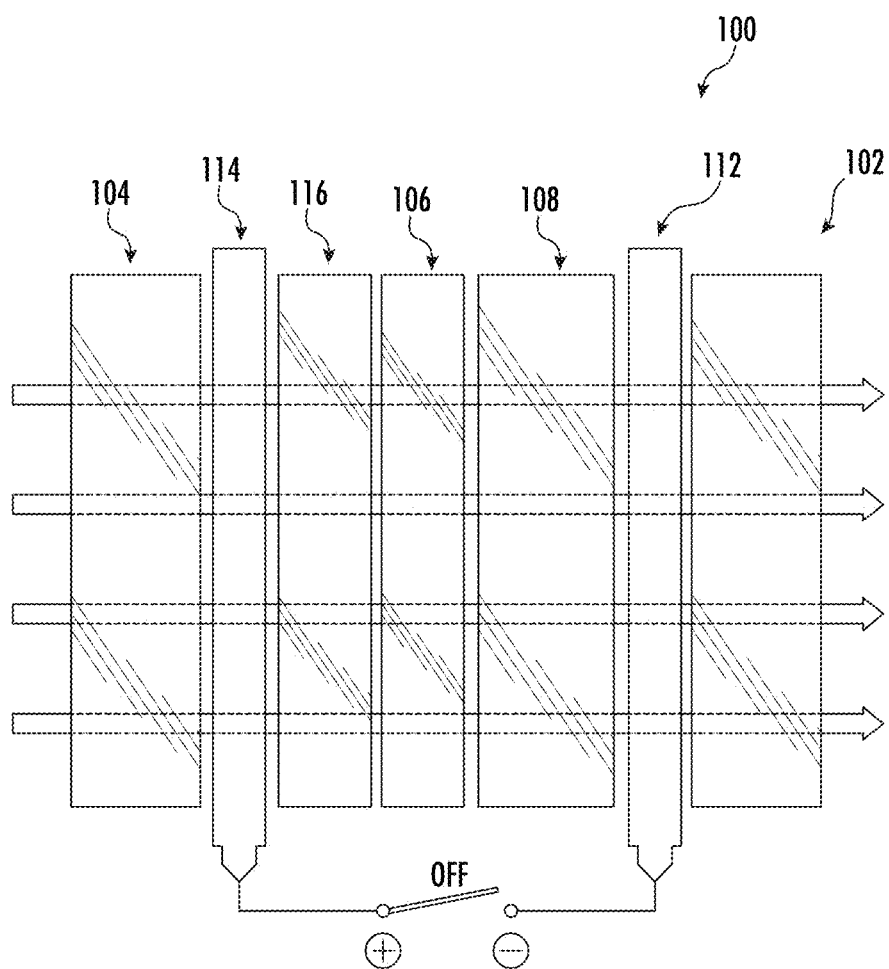
FIG. 1 is a schematic view of an electrochromic cell for a window.

This description and the accompanying drawings illustrate exemplary embodiments and should not be taken as limiting, with the claims defining the scope of the present description, including equivalents. Various mechanical, compositional, structural, and operational changes may be made without departing from the scope of this description and the claims, including equivalents. In some instances, well-known structures and techniques have not been shown or described in detail so as not to obscure the description. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Except as otherwise noted, any quantitative values are approximate whether the word "about" or "approximately" or the like are stated or not. The materials, methods, and examples described herein are illustrative only and not intended to be limiting. Any molecular weight or molecular mass values are approximate and are provided only for description.

While the following description is presented with respect to electrochromic devices or ECDs for windows, it should be understood that devices and methods disclosed herein may be readily adapted for use in a variety of other applications, such as mirrors, optical shutters, color changeable eyewear, welding visors, aircraft windows, display devices, electrochromic glazing systems, safety laminate glass screens for automobiles and the like, dynamically tinting goggles, readable displays, helmet visors, paper for drawing on with a stylus, and other devices that can change optical characteristics or more generally electromagnetic transmission as a result of an applied potential.

Typically, ECDs are of two types depending on the modes of device operation, namely the transmission mode and the reflectance mode. In the transmission mode, the conducting electrodes are transparent and control the light intensity passing through them; this mode is typically used in smart-window applications. In the reflectance mode, one of the transparent conducting electrodes (TCE) is replaced with a reflective surface like aluminum, gold or silver, which controls the reflective light intensity; this mode is useful in the rear view mirrors of cars and EC display devices.

Electrochromic devices can also be categorized in two types depending upon the kind of electrolyte used. Laminated ECDs incorporate liquid gels, while solid electrolyte ECDs incorporate solid inorganic or organic material. The basic structure of electrochromic device embodies five superimposed layers on one substrate or positioned between two substrates in a laminated configuration.

The ECD typically includes five layers positioned between two substrates, such as glass, or flexible polyester foils. The central part of the device is an ion conductor termed an electrolyte that ensures that ions exchange between two electrode materials. Upon application of an electric field, one of the electro-active materials is reduced while the other one is oxidized leading to a change of color or opacity of at least one of them, which induces a change in coloration or opacity in the entire ECD device.

Referring now to FIG. 1, a representative electrochromic window 100 comprises first and second optically transparent layers 102, 104 and an ion conductive layer 106 therebetween. Optically transparent layers 102, 104 may comprise suitably transparent materials that will depend on the specific application for the window 100. In the exemplary embodiment, layers 102, 104 comprise glass, such as tempered glass, laminated glass, engraved glass or the like. There are of course, other substantially clear materials that can be used as layers 102, 104, such as ceramics or polymeric materials, for example, acrylic, polyethylene terephthalate (PET), polycarbonate or polyphosphonate substrates.

In certain embodiments, cell 100 further comprises first and second electrochromic layers 108, 116. The electrochromic or EC layers 108, 116 conduct ions and electrons and belong to the class of mixed conductors. Electrochromic layers 108, 116 may comprise transition metal oxides, transition metal complexes, conducting polymers, viologens, polyaniline, polythiophene, WO3, Prussian Blue and combinations thereof. In some embodiments, the first electrochromic layer 108 is a cathodic electrochromic conducting polymer, such as PEDOT, PProDOT, PEDOP, PTT, PAEM-EDOT and combinations of these. The second electrochromic layer 110 may comprise an anodic electrochromic conducting polymer, such as poly (BEDOT-NMCz), PPro-NPrS and derivatives and combinations of these.

In certain embodiments, cell 100 further includes transparent oxide layers 112, 114 between transparent layers 102, 104 and electrochromic layers 108, 116. The transparent oxide layers 112, 114 are pure electron conductors and may comprise any suitable material with a comparably low absorption of light, such as indium oxide, silicon oxide, indium tin oxide, zinc oxide or combinations of these. These metal oxides can also be doped with traces of fluorides, antimony or aluminum to improve the conductivity. Other transparent conductive materials, such as electrochromic conducting polymers, for example, PEDOT/PSS or carbon nanotube coatings may be used.

The ion conductive layer 106 comprises a polymer layer and an electrolyte. The electrolyte comprises a salt and a plasticizer and may be a solid, liquid or a gel. In a preferred embodiment, the salt is plasticized or otherwise embedded within the polymer layer by the organic solvent, forming a liquid or gel electrolyte. The salt may be present in about 1 to about 8% by weight, the polymer in about 20 to about 70% by weight and the remainder comprising the plasticizing solvent.

In the preferred embodiment, the electrolyte is in the form of a film. The thickness of the film is selected depending on the desired application. For windows and similar applications, the thickness is selected to provide both the requisite conductivity for operation of the electrochromic cell and the optical transparency required for the window. For example, the film may have a thickness of from 1 to 125 microns, preferably about 25 to about 125 microns and more preferably about 30 to about 70 microns.

In certain embodiments, the polymer, salt and plasticizer may be dissolved into a precursor material, such as Tetrahydrofuran (THF) or oxolane, or similar type precursors. Applicant has found that using coating chemistry allows for thinner films to be manufactured which, in turn, increases the ionic conductivity of the film.

The components of the electrolyte will be selected to provide sufficient optical transparency and ionic conductivity for the desired application. In terms of ionic conductivity, the "switching speed" of an electrochromic device is the time that an electrochromic device needs to change the optical density from the fully bleached state to the fully colored state. For certain applications, such as smart windows and the like, the optimal switching speed for the device is in the range of less than 1 minute, preferably less than 30 seconds.

In order to satisfy the switching speed requirements of an electrochromic device, the electrolyte must have sufficient ionic conductivity. The components of the electrolyte are selected such that the ionic conductivity of the ion conductive layer 106 is at least about $3.85 \times 10^{-5}$ Siemens/cm, and preferably between about $3.85 \times 10^{-5}$ and about $6 \times 10^{-4}$ Siemens/cm, although it will be recognized that the ionic conductivity may be greater than $6 \times 10^{-4}$ Siemens/cm in certain applications.

Transmittance refers to the ratio of the radiant power transmitted through a material or device to the incident radiant power. Transmittance is usually expressed as a percent. For example, an electrochromic device with a 50% transmittance (at a specific wavelength) will absorb half of the light incident upon it and allow half of it to pass through. The components herein have been selected such that the transmittance of the ECD is at least greater than about 80%, and preferably greater than about 85%.

The optical transparency of an ECD can also be evaluated based on the "haze" seen when light is transmitted through the ECD. Haze be measured with a haze meter, which typically includes a fiber optic spectrometer, a light source with integrated optical amplification and collimating lens and a custom haze measurement sphere with diffuse transmission port and sample clips. The electrolytes were measured under the standard test method (ASTM D1003-13) for haze. The components of the electrolyte were selected such that the haze is 2% or less.

The performance of electrochromic devices may be evaluated in terms of switching times and transparency (or transmission contrast) under different humidity and temperature conditions. These devices may be tested at reduced pressures. A cycling voltage to operate the cell may be determined by cycling cells at different voltages and monitoring changes in the % T in the clear state after a number of cylces. Potential cycling or stepping can be used to identify the preferred device voltage for a desired operating life.

All components of the electrolyte form a homogenous, generally colorless and crystal-clear composition. The conductive salt is completely dissolved within the polymer.

The materials of the ECD are also selected to provide sufficient extrudability such that the materials can be extruded together to form the final ECD device. Extrudability is the power required to push or force something through an extruder, such single and twin-screw machines, co-rotating or counterrotating, closely intermeshing twin-screw compounders and the like. The mean extrusion force for one or more materials can be tested under standard methods of applying force to the materials until they flow through an outlet (or a plurality of outlets) that may be in the form of one or more slots or holes. The materials are compressed until the structure of the product is disrupted and it extrudes through the outlets. Applicant has determined that higher levels of plasticizer may adversely effect both ionic conductivity and extrudability of the liquid plasticizer and polymer. Thus, the materials selected in herein provide sufficient optical transparency, as well as conductivity and extrudability.

The polymer layer may comprise any suitable polymer that provides sufficient transparency to visible light and exhibits suitable adhesion to surfaces which the polymer may contact within the electrochromic cell. Suitable polymers include thermoplastic polymers or acrylic polymers, such as polymethyl methacrylate (PMMA). In certain aspects, the polymer is sufficiently cross-linked to form a gel in the presence of a solvent. In preferred embodiments, the polymer comprises a thermoplastic polymer, such as thermoplastic polyurethane (TPU). In an exemplary embodiment, the polymer comprises an aliphatic thermoplastic polyurethane having a durometer of at least about 70 Shore A to about 80 Shore D.

Of course, it should be recognized by those skilled in the art that other polymer materials can be used. For example, it may also be suitable to employ polyolefins, polyesters or polycaprolactones, such as polyethylene terephthalate or polybutylene terephthalate. Alternatively, a thermoset polymer that is irreversibly hardened by curing from a soft solid or viscous liquid prepolymer may be used in combination with the thermoplastic polymer.

The electrolyte film may also include mixtures of two or more different polymers, or two or more different polymer layers. In the former instance, the molecular weight of the polymers can be selected depending on the desired properties of the electrolyte.

The electrolyte film may also include a filler having particles sizes ranging from about 1 nm to about 20 um. The filler should have a light transparency of greater than 80% when measured on pure material. Suitable possible fillers include polymer particles, such as polystyrene, polycarbonate or polymethyl methacrylate. Also suitable are inorganic fillers, such as glass powder, glass nanoparticles, or inorganic oxides and mixed oxides.

The salt preferably comprises an alkali or alkaline earth metal salts, such as lithium salts, lithium halides, lithium-metal salts and other lithium compounds. Suitable lithium salts include LiCl, LiF, LiI, $LiNO_3$, $LiClO_4$, $LiBF_4$, $LiPF_6$, $LiAsF_6$, lithium triflate, lithium perchlorate, lithium imide, LiTFSI, LiTDI and the like. In certain embodiments, the lithium salt is present in about 1 to 40% by weight, preferably between about 2 to about 10 wt %.

Of course, it will be recognized that other salts may be used, such as those with cations having the elements of Na, K, Cs, Mg and Ag. It is also possible employ organic salts, such as sodium octylsulfate, lithium dodecylbenzenesulfate or the like. It is also possible to employ mixtures of two or more conductive salts.

In certain embodiments, an ionic liquid additive may be included in the formulation to enhance the ionic conductivity of the plasticizer. The ionic liquid additive would preferably be a liquid at room temperature that can be readily mixed with one or more of the plasticizers described herein. Non-limited examples such ionic liquids include, but are not limited to, 1-Butyl-1-methylpyrrolidinium bis(trifluoromethylsulfonyl)imide ([PYR14][TFSI]), 1-ethyl-3-methylimidazolium, bis[(trifluoromethyl)sulfonyl]imide ([C2mim][TFSI]), 1-ethyl-3-methylimidazolium bis(fluorosulfonyl) imide ([C2mim][FSI]), 1-butyl-3-methylimidazolium bis(trifluoromethylsulfonyl)imide (C4mim][TFSI]), and 1-butyl-3-methyl-imidazolium bis(fluorosulfonyl)imide (C4mim][FSI]) and mixtures thereof.

In other embodiments, a new class of nano-materials may be included within the formulation to enhance ionic conductivity and/or increase mechanical strength. These are solids that will not dissociate when added to the plasticizer. They can be incorporated via mechanical homogenization techniques including but not limited to high intensity agitation, sonication, dry or wet milling, surfactant-assisted wet milling etc. Examples of such nanomaterials include, but are not limited to, $SiO_2$, $ZrO_2$, $Al_2O_3$, $LiLaTiO_3$ and the like.

The plasticizer preferably comprises at least one organic solvent, such as carbonate solvent, lactone solvent or the like. The organic solvent should be selected from a material that provides sufficient ionic conductivity to provide a suitable switching speed for the window. Suitable lactone solvents include, but are not limited to, propiolactones, butyrolactones, crotonolactones, valerolactones and mixtures thereof. Suitable carbonate solvents include diethyl carbonate, propylene carbonate, ethylene carbonate, gammabutryrolactone, dimethyl carbonate, methyl ethyl carbonate, glycerin carbonate, butylene carbonate, alkylene carbonate and combinations thereof. In certain embodiments, the carbonate solvent comprises diethyl carbonate, propylene carbonate, ethylene carbonate and combinations thereof.

The plasticizer will comprise at least one carbonic solvent and one other plasticizer material that increases the optical transparency of the electrolyte. In some embodiments, the plasticizer is another organic carbonate, such as diethyl carbonate, propylene carbonate or ethylene carbonate. Applicant has discovered that a selected mixture of two or more such organic carbonates reduces the overall Ra between the plasticizer and the polymer, thereby increasing the optical clarity of the electrolyte film. In one such embodiment, the plasticizer comprises a mixture of diethyl carbonate and propylene carbonate that provides sufficient conductivity and optical clarity to the electrolyte film. In an exemplary embodiment, the mixture contains about 40% to 90% by volume of the propylene carbonate, more preferably about 50% to about 85% by volume, with the remainder of the mixture substantially comprising diethyl carbonate.

In another embodiment, the plasticizer is selected from the group consisting of a dibenzoate, an acrylate monomer, a phthalate, an aliphatic ester, a non-aliphatic ester, an ethylene glycol bis, a trimellitate, a sebacate, an adipate, a terephthalate, a gluterate, a glyceride, an azelate, a maleate, an epoxidized soybean oil, glycols and polyethers including but not limited to triethylene glycol dihexanoate (3G6), tetracthylene glycol diheptanoate (4G7), triethylene glycol bis(2-ethyl hexanoate) (TEG-EH), tetra ethylene glycol bis (2-ethyl hexanoate) (4GEH), and polyethylene glycol bis(2-ethylhexanoate) (PEG-EH), organophosphates including but not limited to tricresyl phosphate (TCP) and tributyl phosphate (TBP), alkyl citrates, glycerol and acetylated monoglycerides or a mixture of any of these materials. In this embodiment, the plasticizer contains one of these materials combined with an organic carbonate, such as those described above. Applicant has found that a combination of an organic carbonate with one or more of these plasticizers at certain volume percentages reduces the overall Ra between the solvent and the polymer, thereby increasing the optical clarity of the electrolyte film.

It may be possible to include other plasticizers, such as esters of organic acids, e.g., esters of adipic acid or phthalic acid, esters of inorganic acids, such as esters of boric acid, carbonic acid, sulfuric acid and phosphoric acid. It may also be possible to include ethers, such as dibutyl ether, dihexyl ether, diheptyl ether or the like. It is also possible to employ mixtures of different plasticizers so long as the resulting mixture provides the optical transparency and sufficient conductivity to the electrolyte as described herein.

The plasticizer is usually present in an amount of from 1 to 90% by weight, preferably about 30% to about 90% by weight.

In certain embodiments, the plasticizer comprises a dibenzoate or an acrylic monomer. The solvent may comprise an organic carbonate and a plasticizer comprising dibenzoate or acrylic monomer that provides sufficient conductivity and optical clarity to the electrolyte film for the application desired, such as a window. In an exemplary embodiment, the plasticizer has a volume percentage of between about 20% and about 80% of the mixture, preferably between about 50% and 90%.

Compatibility between TPU and liquid electrolytes was assessed based on their Hansen Solubility Parameters. These parameters were obtained from HSPiP version 5.3.04 software. Hansen solubility parameters are used to predict if one material will dissolve in another. Each molecule is given three parametersδδD, δP and δH. δD represents the energy from dispersion forces between molecules. δP represents the energy from dipolar intermolecular forces between molecules, and δH represents the energy from hydrogen bonding between molecules. The distance (Ra) between Hansen parameters of species 1 and 2 in a Hansen space is calculated as per Equation 1 below $$Ra^2 = 4(\delta D_2 - \delta D_1)^2 + (\delta P_2 - \delta P_1)^2 + (\delta H_2 - \delta H_1)^2 \qquad \text{Equation 1}$$

The Hansen Parameters for several organic carbonates and other co-solvents are listed in Table 1 below.

TABLE 1

Hansen Solubility Parameters for Organic Carbonates and other co-solvents

|  | δD | δP | δH | Ra vs. TPU |
|---|---|---|---|---|
| TPU | 18.1 | 9.3 | 4.5 | 0.00 |
| Benzoflex 9-88 SG (B9-88) | 17.9 | 5.6 | 3.8 | 3.79 |
| Diethyl carbonate (DEC) | 15.6 | 7.8 | 6.1 | 5.46 |
| Propylene carbonate (PC) | 20 | 18 | 4.1 | 9.5 |
| Ethylene Carbonate (EC) | 18 | 21.7 | 5.1 | 12.42 |
| SR355 | 16.6 | 2.2 | 6.8 | 8.04 |
| SR533 | 16.4 | 6.1 | 3.3 | 4.82 |

Benzoflex 9-88 SG is a trade name for 3,3'-Oxybis(1-propanol) dibenzoate plasticizer from Eastman Chemicals. It is a high refractive index, high solvating plasticizer designed for TPU applications to allow adjustments to the durometer range. SR355 (di-trimethylolpropane tetraacrylate) and SR533 (triallyl isocyanurate) are acrylic monomers from Sartomer. Rhodiasolve IRIS is a trade name for an oxygenated solvent that is non-toxic, biodegradable and non-flammable from Solvay. TEG-EH is a trade name for Triethylene Glycol Bis (2-Ethylhexanoate) from Eastman. The TPU listed in Table 1 is a generic polymer with urethane linkages. As seen from Table 1, based on Ra values, B9-88 is closest to TPU followed by SR533. This means that amongst all the species listed in Table 1, Benzoflex 9-88 is the most compatible with TPU. Amongst organic carbonates, diethyl carbonate is the most compatible with TPU and ethylene carbonate is the least compatible.

Applicant has tested the clarity of an electrolyte comprising TPU, a lithium salt and a propylene carbonate (Ra=9.5 as shown in Table 1). This test was conducted by the following steps: (1) dissolve LiClO4 in propylene carbonate prior to brabender compounding; (2) dry approximately 250 g of AG8451 overnight; (3) set the process temperature to 115° C.; (4) load AG8451 to the mixer and run at 25 RPM; (5) once the AG451 has melted (~20 min), add the LE dropwise with a syringe Increase mixer speed to 200 rpm until achieving a 1000 m-g of torque; (6) at 1000 m-g torque, reduce mixer speed to 60 rpm and let the melt temperature reduce and stabilize; (7) once the melt temperature has stabilized, maintain at 60 RPM's for a minimum of 15 minutes or until homogeneous; (8) flatten the compound as much as possible, allow to cool then package in a zip lock bag; (9) press a 20 mil sheet between two PET films at 115 C; and (10) package in a zip lock bag with a dessicant. Applicant's tests indicated that this composition renders an optically opaque electrolyte (i.e., a haze of greater than 2% as measured by ASTM D1003-13).

Applicant has also tested the clarity of an electrolyte comprising TPU, a lithium salt and Benzoflex 9-88. A similar test method was employed. These tests indicated that this composition renders an optically transparent electrolyte (i.e., a haze or less than or equal to 2% as measured by ASTM D1003-13). Since the Ra of Benzoflex 9-88 and TPU is 3.79, this value was chosen as a proxy threshold to determine optical clarity of a plasticized TPU film. In other words, Ra<3.79 is likely to produce an optically clear film, whereas Ra>3.79 is more likely to produce an optically opaque film.

It should be understood, however, that the present description is not necessarily limited to co-solvents having an Ra of 3.79 or less. Applicant has determined that an RA of 3.79 or less will result in an optically transparent ECD having a haze of 2% of less. However, the Ra between the co-solvents may be higher than 3.79 and still result in a sufficiently transparent device, depending on the particular application for the ECD. In certain embodiments, for example, the Ra between the co-solvents may be about 5.0 or less.

The Ra of mixed plasticizers vs TPU are calculated using Equation 1. They have been plotted for several systems in FIGS. 2A-2C. For each plotted line in the graphs of FIG. 2A-2C, the left end of the line represents 0% of the first solvent and 100% of the second solvent listed in the key above the graph. Likewise, the right side of the line represents 100% of the first solvent and 0% of the second solvent. For example, B988+EC starts on the left side of the graph in FIG. 2A with an Ra versus TPU of 12.42 (100% by volume ethylene carbonate or EC) and ends on the right side of the graph with an Ra versus TPU of 3.79 (100% by volume Benzoflex 9-88 SG or B988). The line marked "Optical Clarity Threshold" represents 100% B988 or an Ra of 3.79 for reference purposes.

Figure 2A:
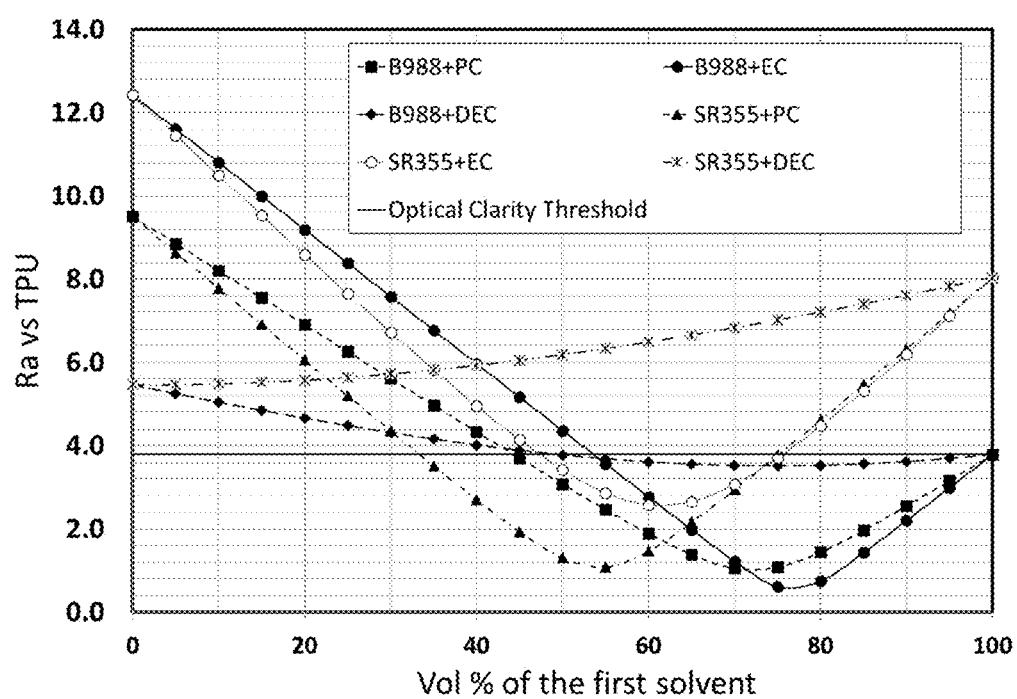
FIGS. 2A-2C are graphs illustrating Ra versus TPU for various formulations described herein.
Figure 2B:
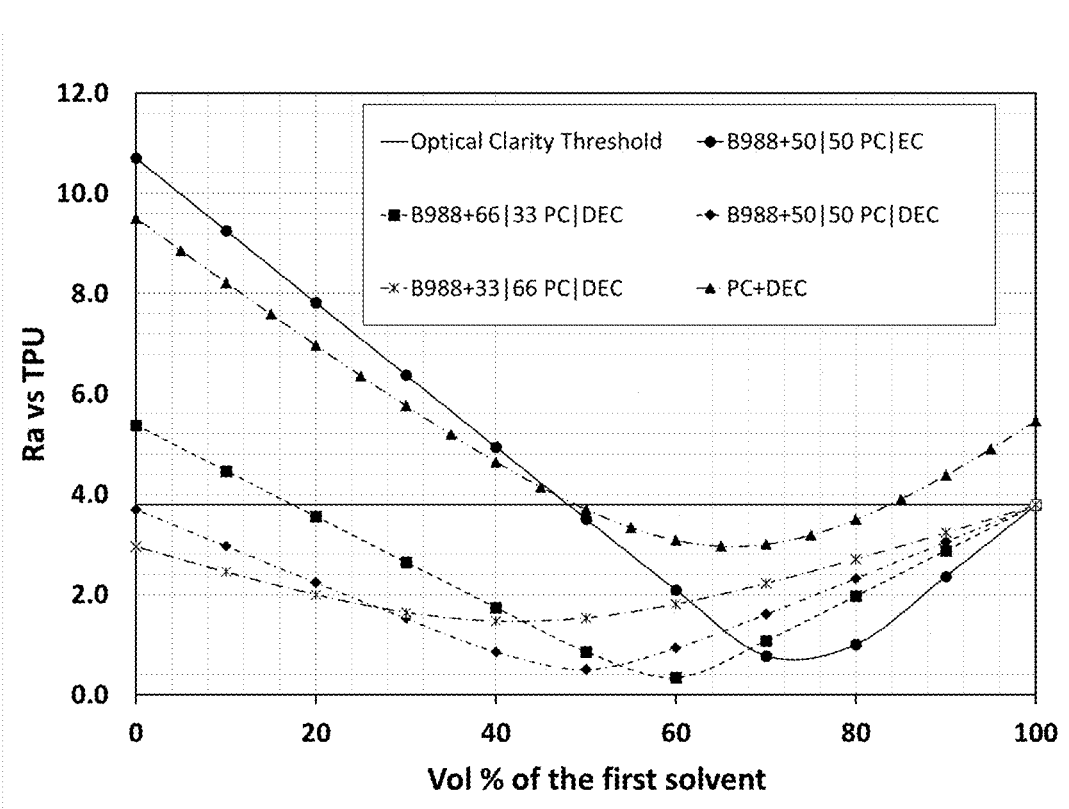
Figure 2C:
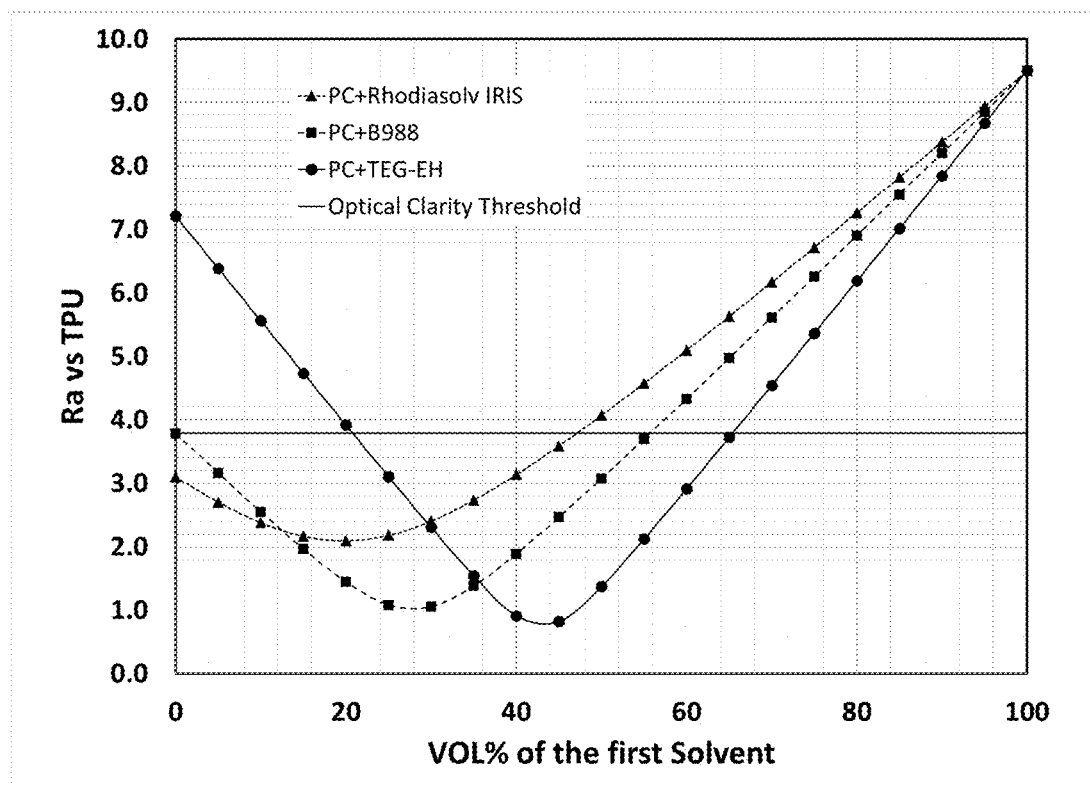

It is interesting to note that the Ra for each mixed electrolyte system shown in FIGS. 2A-2C goes through a minimum. In other words, the compatibility of a mixed electrolyte system with TPU can be better than that of an individual electrolyte with the same TPU at certain volume percentages of the mixed plasticizers. This observation can be used advantageously to incorporate an organic carbonate in the plasticizer mix without exceeding the Ra threshold of 3.79, described in the previous paragraph. For example, a 50/50 by volume blend of Benzoflex 9-88 and propylene carbonate has a comparable Ra vs TPU as 100% by volume Benzoflex 9-88. Hence, a 50/50 v blend of Benzoflex 9-88 and propylene carbonate should have the same compatibility with TPU as 100% v Benzoflex 9-88. Similarly, a 50/50 v blend of propylene carbonate and diethyl carbonate has the same Ra vs TPU, and hence the same compatibility, as 100% v Benzoflex 9-88. A 33/66 v blend of diethyl carbonate and propylene carbonate has a lower Ra vs TPU, and hence superior compatibility, compared to 100% v Benzoflex 9-88.

FIGS. 2A-2C illustrate a number of volume percentage combinations of organic carbonates and other co-solvents that would product sufficient transparency to the ECD according to the parameters defined herein. For example, one such combination includes Benzoflex 9-88 SG and ethylene carbonate (see FIG. 2A). A volume percentage of about 55% to 100% of the Benzoflex 9-88 G (with the remainder of the solvent comprising ethylene carbonate) produces a plasticizer having an Ra of 3.79 or less with TPU. To further refine these parameters, the overall conductivity of the resulting electrolyte is tested according to the test methods discussed above. It is understood that at least some volume percentage of ethylene carbonate is required in the mixture to produce satisfactory conductivity to the electrolyte (i.e., 100% Benzoflex 9-88 G would not be sufficiently conductive). Thus, the volume percentage to meet both the requirements of clarity and conductivity is between about 55% to about 90%, preferably about 55% to about 75%, Benzoflex 9-88 G with the remainder of the solvent comprising ethylene carbonate.

As another example, propylene carbonate can be combined with SR355 to product an optically transparent film. As shown in FIG. 2A, a volume percentage of about 33% to about 75% of SR355 (with the remainder propylene carbonate) produces a combined plasticizer having an Ra of 3.79 or less with TPU. Thus, even though each of these plasticizers would be optically opaque with TPU by themselves, a combination of the two materials in this volume range would provide an optically transparent electrolyte having a haze of 2% or less.

Other examples of suitable combinations of organic carbonates and other co-solvents as shown in FIGS. 2A and 2B include, but are not limited to: (1) a mixture of Benzoflex 9-88 SG and propylene carbonate that includes about 45% to about 95% Benzoflex 9-88 G (preferably 90% or less for conductivity purposes) with the remainder of the solvent comprising propylene carbonate; (2) a mixture of Benzoflex 9-88 SG and diethyl carbonate that includes about 50% to about 95% Benzoflex 9-88 G (preferably 90% or less for conductivity purposes) with the remainder of the solvent comprising diethyl carbonate; (3) a mixture of SR355 and ethylene carbonate that includes about 48% to about 75% SR355 with the remainder of the solvent comprising ethylene carbonate; (4) a mixture of Benzoflex 9-88 SG and a 50/50 mixture of propylene carbonate and ethylene carbonate that includes about 50% to about 95% Benzoflex 9-88 G (preferably 90% or less for conductivity purposes) with the remainder of the solvent comprising a 50/50 mix of ethylene carbonate and propylene carbonate; (5) a mixture of Benzoflex 9-88 SG and a 50/50 mixture of propylene carbonate and diethyl carbonate that includes about 5% to about 95% Benzoflex 9-88 G (preferably 90% or less for conductivity purposes) with the remainder of the solvent comprising a 50/50 mix of diethyl carbonate and propylene carbonate; (6) a mixture of Benzoflex 9-88 SG and a 66 mixture of 66/33 propylene carbonate and diethyl carbonate that includes about 20% to about 95% Benzoflex 9-88 G (preferably 90% or less for conductivity purposes) with the remainder of the solvent comprising a 66/33 mix of propylene carbonate and diethyl carbonate; or (7) a mixture of Benzoflex 9-88 SG and a 33/66 mixture of propylene carbonate and diethyl carbonate that includes about greater than 0% Benzoflex 9-88 G to about 95% Benzoflex 9-88 G (preferably 90% or less for conductivity purposes) with the remainder of the solvent comprising a 33/66 mix of propylene carbonate and diethyl carbonate It should also be noted that combining two organic carbonates together can also result in an Ra of 3.79 or lower versus TPU at selected volume combinations. For example, as shown in FIG. 2B, a mixture of ethylene carbonate and diethyl carbonate has an Ra of less than 3.79 when the volume percentage of the diethyl carbonate is about 50% to 85% with the remainder being ethylene carbonate.

The results in FIGS. 2A-2C are for illustrative purpose only and are not meant to be exhaustive. It should be possible to those skilled in the art to select other organic carbonates and cosolvents such that the Ra vs TPU is no greater than 3.79. Examples of cosolvents may include but are not limited to other dibenzoate plasticizers such as Benzoflex 352, Benzoflex 2088, Benzoflex 50 etc., other phthalate plasticizers such as diisobutyl phthalate, diisononyl phthalate etc., other non-phthalate plasticizers such as 1,2-Cyclohexane dicarboxylic acid diisononyl ester (DINCH) and other non-aromatic plasticizers such as triethylene glycol bis (2-ethylhexanoate) (TEG-EH), tetracthylene glycol bis (2-ethylhexanoate), polyethelene glycol bis (2-ethylhexanoate). (PEG-EH) etc.

The mixed plasticizer may preferentially include one or more additives including but not limited to UV stabilizers or blockers, such as for example Uvinul® or Irgastab®, antioxidants, such as Irganox®, Ultranox® or Sicostab®. viscosity modifiers, dispersion auxiliaries, photoinitiators and the like.

The electrolyte can be prepared by plasticizing and intensively mixing the above-mentioned components with another in a suitable mixer at elevated temperatures. Suitable intensive mixers are compounders or single or multi-screw extruders. Extrusion devices that can be employed, for example, include single and twin-screw machines, co-rotating or counterrotating, closely intermeshing twin-screw compounders and the like. The electrolyte may be shaped into a film using a melt pump, a slot die and a suitable smoothing tool, such as a chill roll polishing stack. The film can subsequently be treated by further process steps, for example, by rolling calendaring or chill-roll methods. In addition, a surface structure can be embossed in the films during this treatment.

In certain embodiments, the plasticizer can be blended with TPU via melt blending. TPU can be premixed with the plasticizer prior to feeding to a single or twin-screw extruder fitted with a flat die. Alternatively, dry TPU and plasticizer (in the form of powder, granules, pellets or the like) can be fed separately into a twin-screw compounding extruder.

Example 1

Estane AG8451 optical grade polyether-based TPU was brabended with 43 phr 50/50 w Benzoflex 9-88/propylene carbonate mixed plasticizer containing 0.4M $LiClO_4$. The $LiClO4$ was dissolved in propylene carbonate prior to brabender compounding and dried overnight. In two separate tests, the LiClO4/PC weight ratio was between about 8% to about 13%. The materials were input into a twin screw brabender wherein the TPU was pre-melted at a temperature of 115° C. and mixed at 25 RPM prior to slow addition of mixed plasticizer liquid electrolyte with a syringe. The melt was allowed to homogenize for a minimum of 15 minutes. Once the AG8451 had melted (approximately 20 min), the LE was added dropwise with a syringe. The mixer speed was increased to 200 rpm until achieving a 1000 m-g of torque At 1000 m-g torque, the mixer speed was reduced to 60 rpm and the melt temperature was reduced to stabilize the process. Once the melt temperature had stabilized, the screw was maintained at 60 RPM's for a minimum of 15 minutes or until the mixture was homogeneous. The compound was flattened as much as possible, and allowed to cool. It was then packaged in a zip lock bag. A 20 mil sheet was pressed between two PET films at 115 C and was then packaged in a zip lock bag with a dessicant.

Films were cast from this material via compression molding using a Carver press set at 230° F., producing a 10 mil electrolyte film that was optically clear under ambient conditions. The film was laminated with one cathode and two anode samples separately. The resulting laminates were also optically clear after 5 hours of vacuum lamination.

While the devices, systems and methods have been described in detail herein in accordance with certain preferred embodiments thereof, many modifications and changes therein may be effected by those skilled in the art. Accordingly, the foregoing description should not be construed to be limited thereby but should be construed to include such aforementioned obvious variations and be limited only by the spirit and scope of the following claims.

What is claimed is:

1. An electrolyte film comprising:
   a polymer layer;
   an electrolyte within the polymer layer, wherein the electrolyte comprises a salt and a plasticizer; and
   wherein an Ra between the plasticizer and the polymer layer is less than about 5.0.

2. The film of claim 1, wherein the film comprises a haze of about 2% or less as measured by ASTM D1003-13.

3. The film of claim 1, wherein the film has an ionic conductivity of at least about $3.85 \times 10^5$ Siemens/cm.

4. The film of claim 1, wherein the electrolyte is substantially liquid.

5. The film of claim 1, wherein the electrolyte is a gel.

6. The film of claim 1, wherein the plasticizer comprises an organic carbonate and a second material selected from the group consisting of dibenzoate, an acrylate monomer, a phthalate, an aliphatic ester, a non-aliphatic ester, an ethylene glycol bis, a trimellitate, a sebacate, an adipate, a terephthalate, a gluterate, a glyceride, an azelate, a maleate, an epoxidized soybean oil, glycols and polyethers, organophosphates, alkyl citrates, glycerol and acetylated monoglycerides or a mixture thereof.

7. The film of claim 6, wherein the second material has a volume percentage of about 20% to about 80% of the plasticizer.

8. The film of claim 1 wherein the salt is a lithium salt.

9. The film of claim 6, wherein the organic carbonate is selected from the group consisting of diethyl carbonate, propylene carbonate, ethylene carbonate, gammabutryrolactone, dimethyl carbonate, methyl ethyl carbonate, glycerin carbonate, butylene carbonate, alkylene carbonate and combinations thereof.

10. The film of claim 9, wherein the organic carbonate is selected from the group consisting of diethyl carbonate, propylene carbonate and ethylene carbonate.

11. An electrolyte film comprising:
a polymer layer;
an electrolyte within the polymer layer, wherein the electrolyte comprises a salt and a plasticizer; and
wherein the plasticizer comprises a mixture of a combination of at least two of propylene carbonate, diethyl carbonate and ethylene carbonate, and a material selected from the group consisting of a dibenzoate, an acrylate monomer, a phthalate, an aliphatic ester, a non-aliphatic ester, an ethylene glycol bis, a trimellitate, a sebacate, an adipate, a terephthalate, a gluterate, a glyceride, an azelate, a maleate, an epoxidized soybean oil, glycols and polyethers, organophosphates, alkyl citrates, glycerol and acetylated monoglycerides or a mixture thereof.

12. The film of claim 11, wherein the plasticizer comprises propylene carbonate and ethylene carbonate.

13. The film of claim 11, wherein the plasticizer comprises propylene carbonate and diethyl carbonate.

14. The film of claim 11, wherein the plasticizer comprises ethylene carbonate and diethyl carbonate.

15. An electrolyte film comprising:
a polymer layer;
an electrolyte within the polymer layer, wherein the electrolyte comprises a salt and a plasticizer; and
wherein the plasticizer comprises an organic carbonate selected from the group consisting of propylene carbonate, diethyl carbonate, and ethylene carbonate and a material selected from the group consisting of ethylene glycol, an oxygenated solvent, or a mixture thereof.

16. The film of claim 15, wherein the material comprises ethylene glycol.

17. The film of claim 15, wherein the material comprises the oxygenated solvent.

18. An electrochromic cell comprising:
first and second layers of an optically transparent material; and
an ion conductive layer between the first and second layers, the ion conductive layer comprising:
a polymer layer;
a salt; and
a plasticizer, wherein an Ra between the plasticizer and the polymer layer is less than about 5.0.

19. The film of claim 18, wherein the plasticizer comprises an organic carbonate and a second material selected from the group consisting of dibenzoate, an acrylate monomer, a phthalate, an aliphatic ester, a non-aliphatic ester, an ethylene glycol bis, a trimellitate, a sebacate, an adipate, a terephthalate, a gluterate, a glyceride, an azelate, a maleate, an epoxidized soybean oil, glycols and polyethers, organophosphates, alkyl citrates, glycerol and acetylated monoglycerides or a mixture thereof.

20. The film of claim 19, wherein the organic carbonate is selected from the group consisting of diethyl carbonate, propylene carbonate, ethylene carbonate, gammabutryrolactone, dimethyl carbonate, methyl ethyl carbonate, glycerin carbonate, butylene carbonate, alkylene carbonate and combinations thereof.

21. The film of claim 19, wherein the organic carbonate is selected from the group consisting of diethyl carbonate, propylene carbonate and ethylene carbonate.

* * * * *